March 28, 1961     C. W. VOGT     2,976,654
METHOD AND APPARATUS FOR FILLING GUSSETED CONTAINERS
Filed Aug. 8, 1957     8 Sheets-Sheet 1
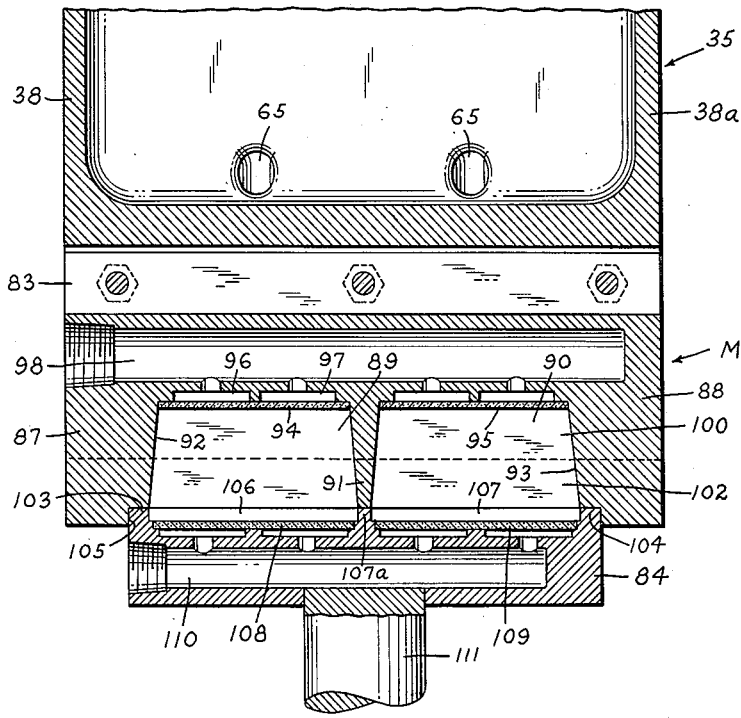
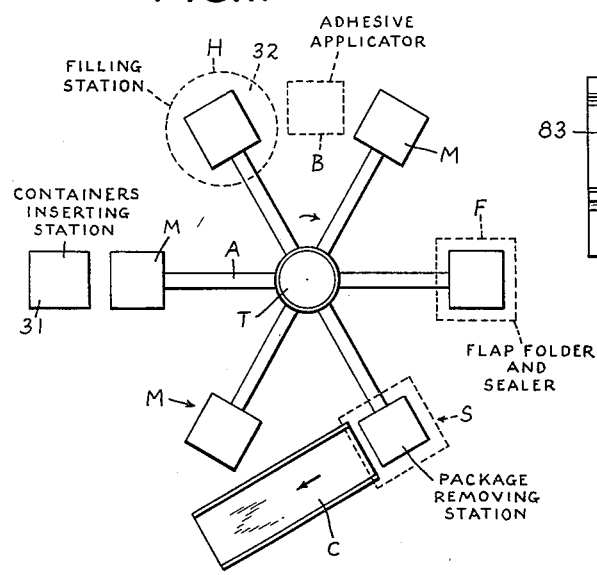
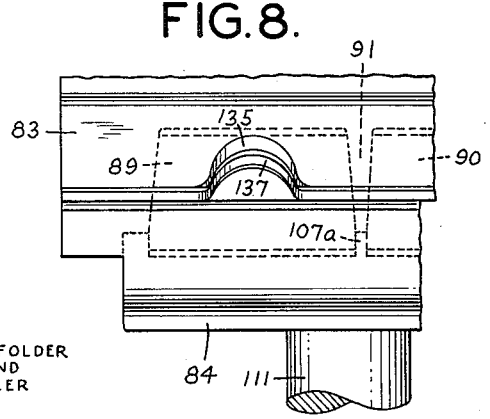
INVENTOR
CLARENCE W. VOGT
BY
HIS ATTORNEYS March 28, 1961 C. W. VOGT 2,976,654
METHOD AND APPARATUS FOR FILLING GUSSETED CONTAINERS
Filed Aug. 8, 1957 8 Sheets-Sheet 3
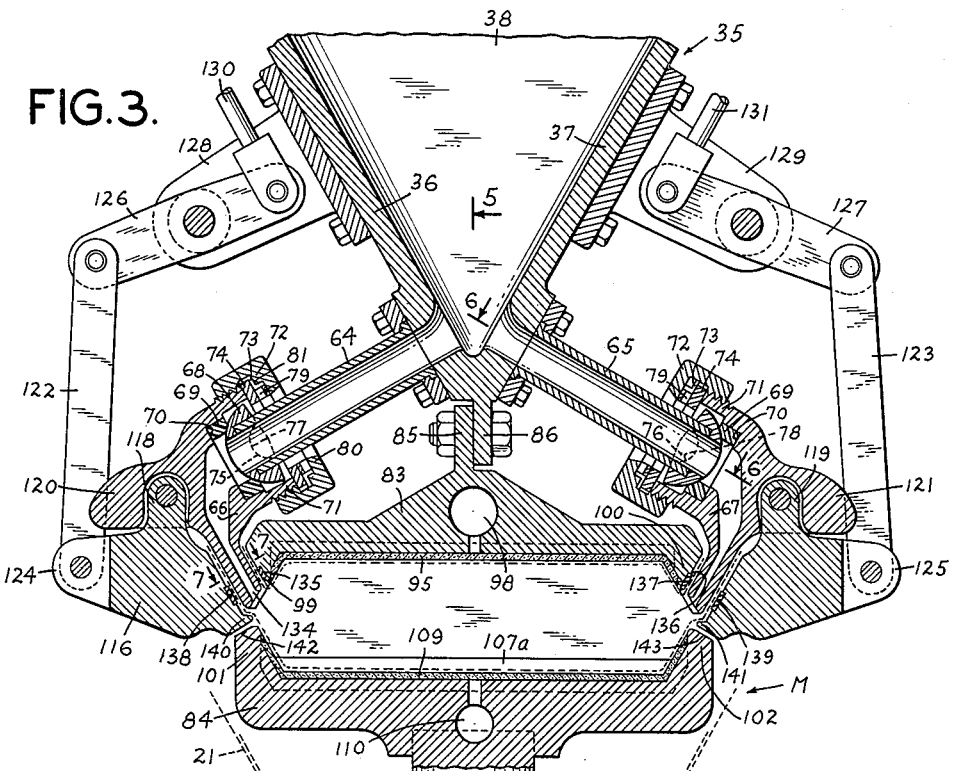
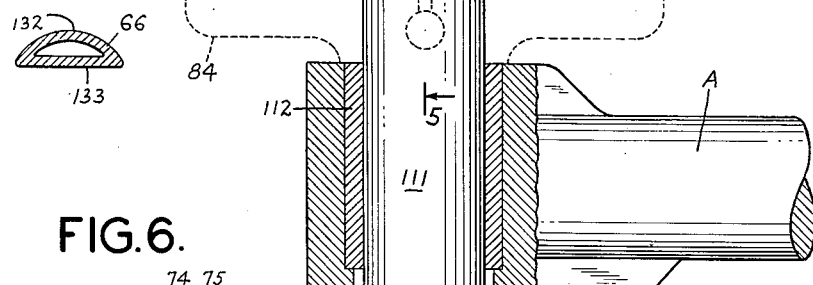
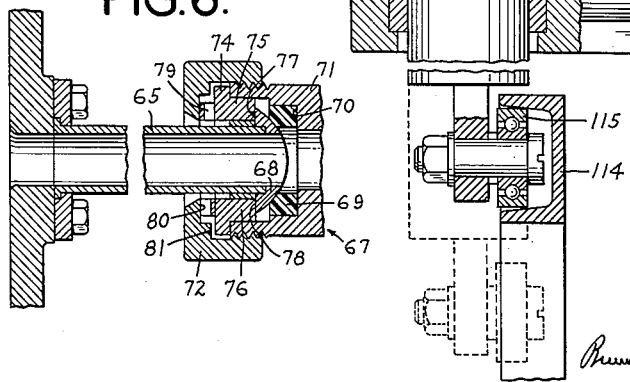
INVENTOR
CLARENCE W. VOGT
BY
HIS ATTORNEYS March 28, 1961   C. W. VOGT   2,976,654
METHOD AND APPARATUS FOR FILLING GUSSETED CONTAINERS
Filed Aug. 8, 1957   8 Sheets-Sheet 4
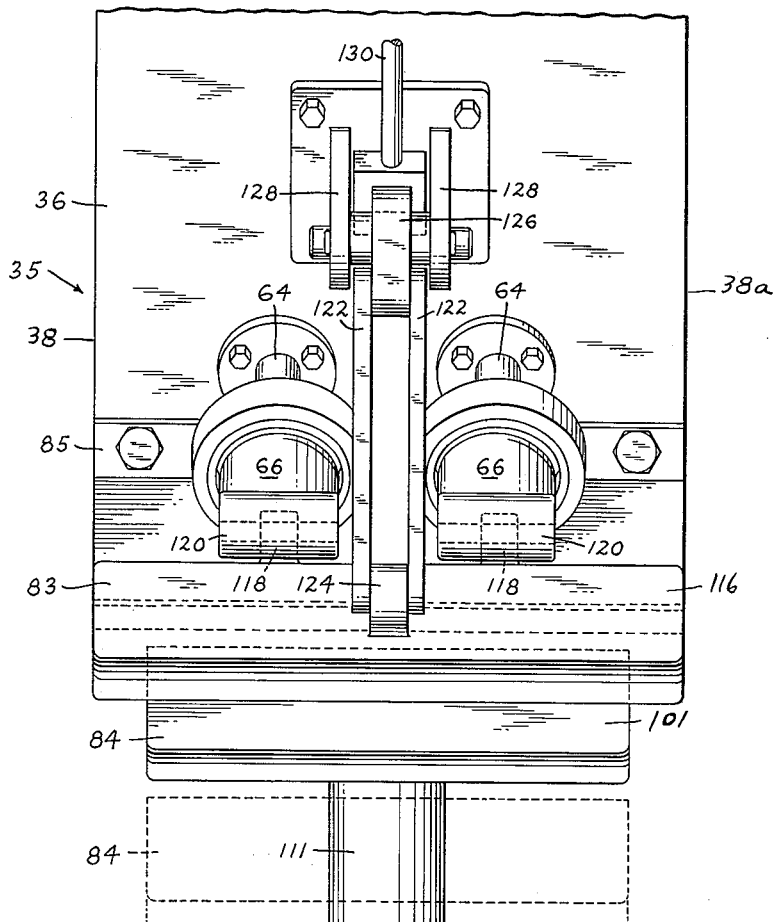
FIG.4.
INVENTOR
CLARENCE W. VOGT
BY
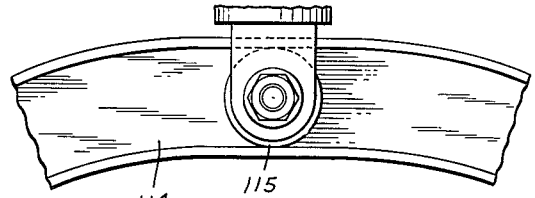
HIS ATTORNEYS March 28, 1961 C. W. VOGT 2,976,654
METHOD AND APPARATUS FOR FILLING GUSSETED CONTAINERS
Filed Aug. 8, 1957 8 Sheets-Sheet 5
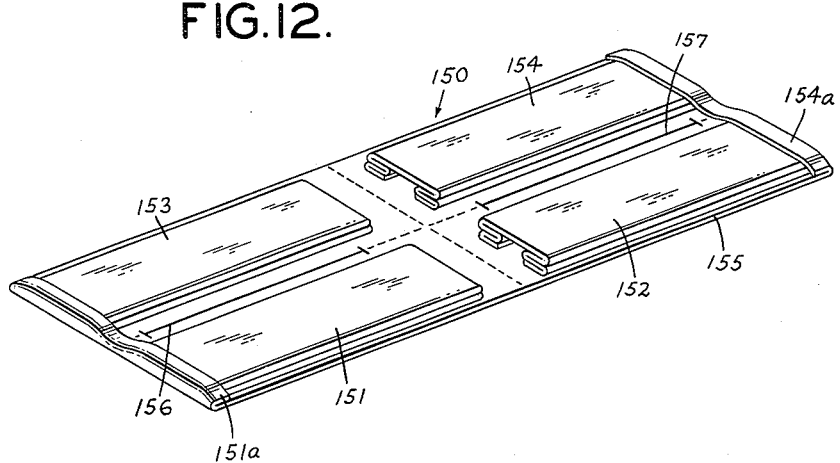
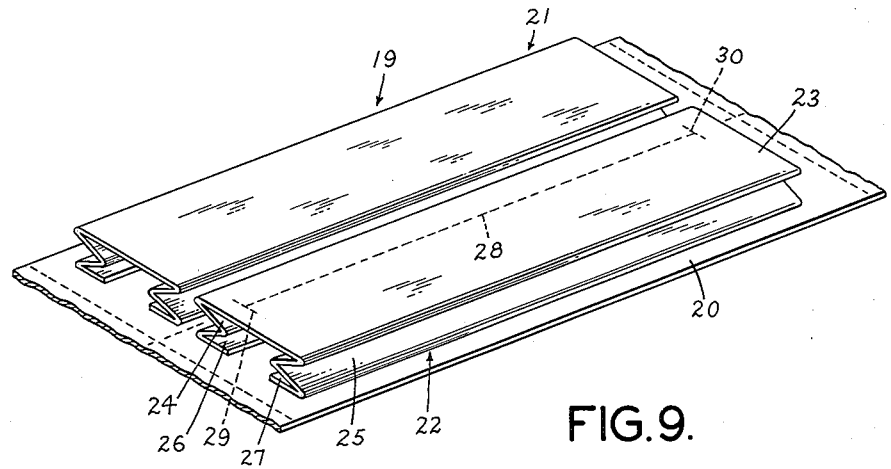
INVENTOR
CLARENCE W. VOGT
BY
HIS ATTORNEYS March 28, 1961 C. W. VOGT 2,976,654
METHOD AND APPARATUS FOR FILLING GUSSETED CONTAINERS
Filed Aug. 8, 1957 8 Sheets-Sheet 6

INVENTOR
CLARENCE W. VOGT
BY
HIS ATTORNEYS

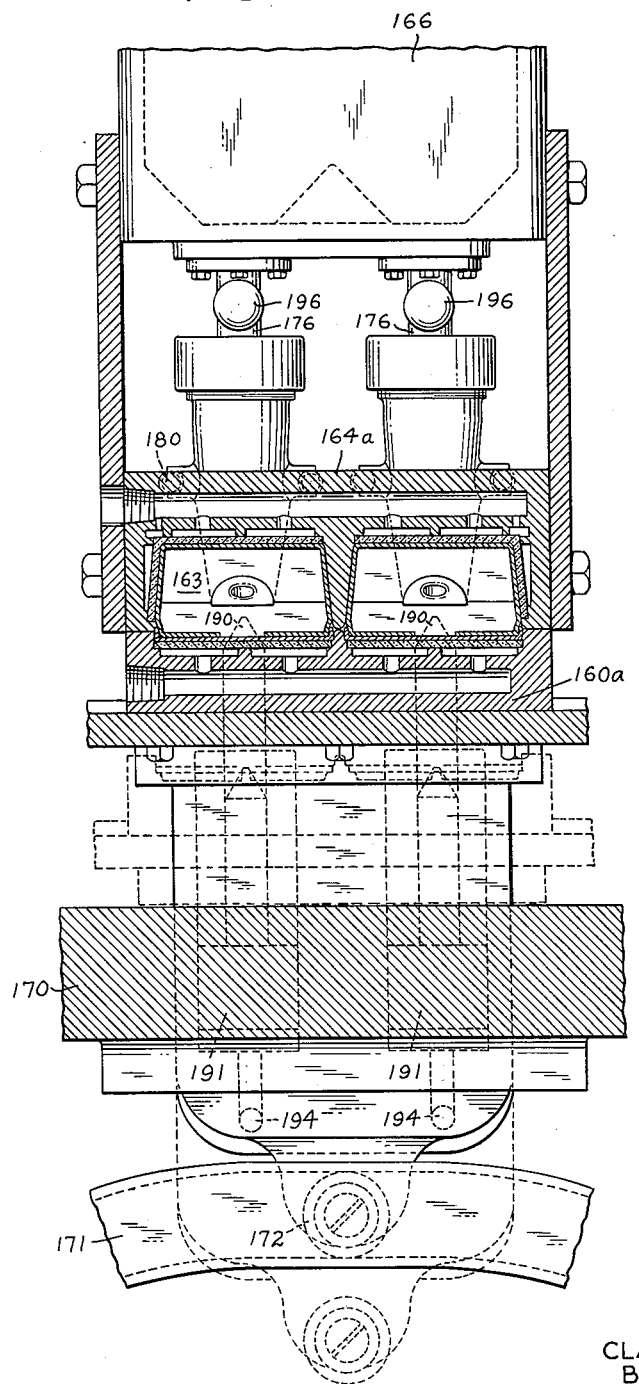

March 28, 1961 C. W. VOGT 2,976,654
METHOD AND APPARATUS FOR FILLING GUSSETED CONTAINERS
Filed Aug. 8, 1957 8 Sheets-Sheet 8

INVENTOR
CLARENCE W. VOGT
BY
HIS ATTORNEYS

United States Patent Office 2,976,654
Patented Mar. 28, 1961

2,976,654

METHOD AND APPARATUS FOR FILLING GUSSETED CONTAINERS

Clarence W. Vogt, Weston, Conn.
(Rte. 4, Westport, Conn.)

Filed Aug. 8, 1957, Ser. No. 677,113

15 Claims. (Cl. 53—37)

This invention relates to methods and apparatus for filling containers and it relates particularly to the filling of gusseted collapsible tubular containers with fluent materials such as liquids, semi-plastic or plastic materials and finely-divided materials including flour, sugar, pie-crust mixes, cake mixes, and the like.

As disclosed in co-pending applications Serial Nos. 585,775, 595,249, 594,152 (now U.S. Patent No. 2,935,233 dated May 3, 1960), 599,632 and 611,231, now forfeited, I have provided methods and apparatus for introducing materials generally of the type referred to above into containers which are either pre-formed and positioned in supporting molds or are shaped by means of gas pressure to fit the mold, the apparatus also including mechanisms for closing and sealing the containers.

Also disclosed in my co-pending application Serial No. 671,202, filed July 11, 1957, are improvements in gusseted collapsible containers which are adapted to be filled with fluent materials introduced into the containers under pressure.

In accordance with the present invention, I have provided improved apparatuses for and methods of filling gusseted tubular containers of the types disclosed in application Serial No. 671,202, filed July 11, 1957, by introducing the filling material into one or both open ends of the containers while they are in collapsed condition in a confining cavity or mold so that the containers are expanded into contact with the walls of the cavity or mold to produce fully filled packages containing accurately controlled charges or filling of the fluent material.

More particularly, in accordance with the present invention, one or more gusseted containers in a collapsed or flattened condition are placed in molds having relatively movable sections which serve to confine the containers as they are expanded during filling to control accurately the volume of the filling material introduced into the containers. Inasmuch as the molds have separable sections, the filled containers can be discharged therefrom after filling, or they can be moved while supported by sections of the mold to suitable apparatus for closing and sealing the open end or ends of each container.

When filling the containers with liquid or other relatively incompressible material, the volume of such a material is related directly to the weight of the material and containers which are filled with equal volumes of material also hold equal weights of material. In the case of fluent materials which contain air or other gas, the weight of the material in the containers can be controlled by regulating the pressure at which these materials are introduced into the containers. Thus, by maintaining a predetermined pressure on the material, a uniform volume and weight of the material can be introduced into each container.

By increasing or decreasing the pressure, the weight of the fluent, aerated or gas-containing material can also be varied to permit accurate control of the filling operation.

For a better understanding of the present invention, reference may be had to the accompanying drawings, in which:

Figure 1 is a schematic plan view of a typical apparatus embodying the present invention;

Figure 3 is an enlarged view in vertical section of a portion of the filling head and mold shown in Figure 2 illustrating details thereof;

Figure 4 is a side elevational view of a portion of the filling head shown in Figure 3;

Figure 5 is a view in section taken on line 5—5 of Figure 3;

Figure 6 is a view in section taken on line 6—6 of Figure 3;

Figure 7 is a view in section through a filling nozzle taken on line 7—7 of Figure 3;

Figure 8 is a fragmentary view in end elevation of a mold for receiving the gusseted containers;

Figure 9 is a perspective view of a pair of gusseted containers of the type to be filled with an apparatus of the type shown in Figures 1 to 8;

Figure 11 is a view in section taken on line 11—11 of Figure 10;

Figure 12 is a perspective view of a multiple container unit of a type to be filled by means of the apparatus disclosed in Figures 10 and 11;

Figure 2:
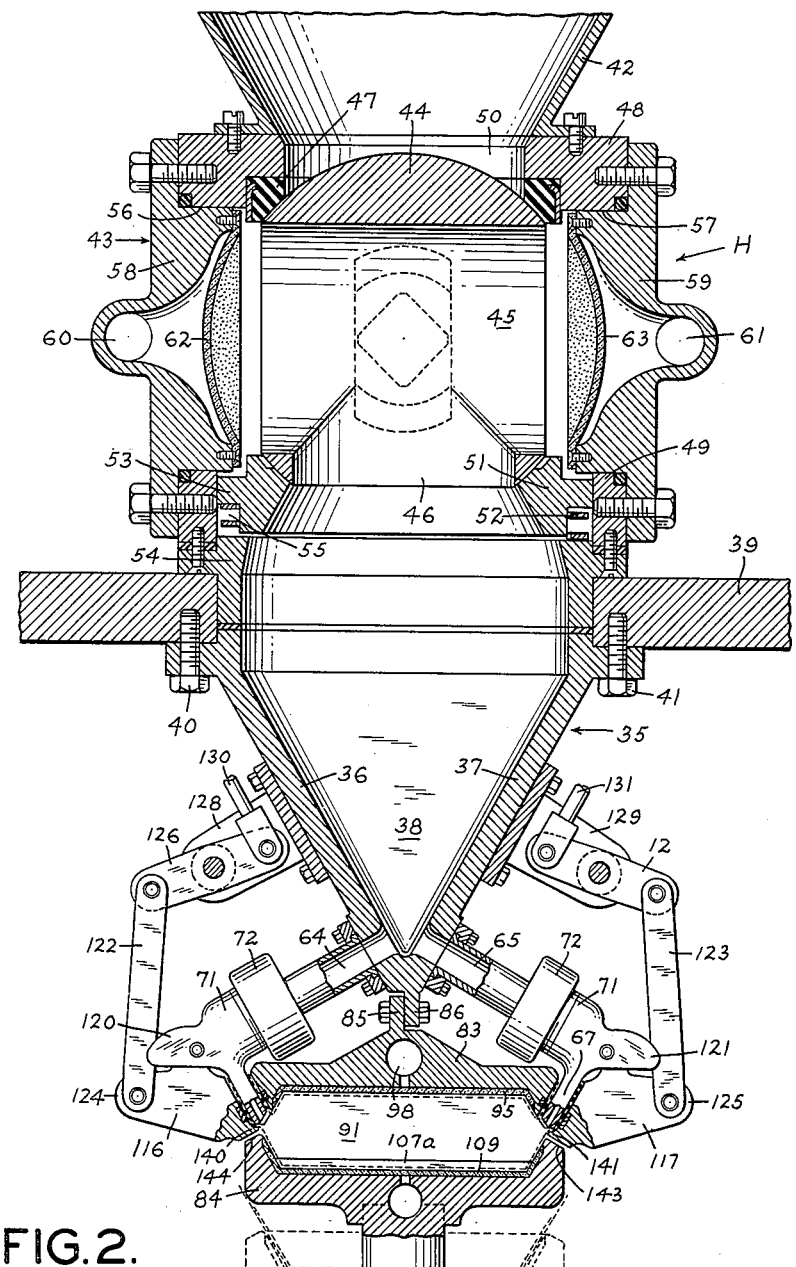
Figure 2 is a view in vertical section and partly broken away of a filling head and mold for introducing fluent material into gusseted containers.

As indicated above, collapsible, gusseted containers of the type disclosed in my co-pending application Serial No. 671,202, filed July 11, 1957, are used in the filling apparatuses and methods described hereinafter. Referring to Figure 9 of the drawings, a typical gusseted container unit 19 includes a web or sheet 20 which forms a common side of one or more tubular or semi-tubular containers 21, 22, etc. Each container includes a generally rectangular top panel 23 and inwardly folded side gussets 24 and 25 having inturned flaps 26 and 27 at their lower edges secured by means of adhesive or the like to the sheet or web 20. The tubular containers 21 and 22 are normally in a collapsed or flattened condition and the web portion 20 extends beyond the ends and the lateral edges of the members 21 and 22. Between each element 21 and 22, the web 20 is provided with a longitudinally extending slit 28 which may also have transversely extending short slits 29 and 30 at its opposite ends which define narrow flaps that can be displaced out of the plane of the web 20 for a purpose to be described hereinafter. Moreover, score lines or rows of perforations may extend beyond the slit 28 to facilitate separation of the containers from each other.

Referring now to Figure 1 of the drawings, container units 19 which include one or more tubular containers 21, 22 are introduced into successive mold sections M which are carried on radially extending arms A fixed to a turntable T adapted to be rotated step by step in a clockwise direction as indicated by the arrow in Figure 1. Each collapsed container unit is inserted in the mold section M at the container inserting station 31 and then is moved to a filling station 32 where the fluent material is introduced into the container or containers by means of a filling head H. Thereafter, the open end or ends of the containers may have adhesive applied thereto by means of an adhesive applicator B of conventional type or, if the container material is thermoplastic or has a thermoplastic or heat-responsive adhesive applied thereon during manufacture of the container unit, the filled containers may be transferred to a flap-folding apparatus F where the ends of the containers are folded over and sealed together to form a finished sealed package. Thereafter, as the mold sections M move, they pass a package removing station S where the filled containers 19 are lifted from or ejected from the mold sections M and are delivered to a conveyor or chute C for further processing.

The adhesive applicator, the flap folder and sealer and the package remover at the package removing station are of conventional type and inasmuch as their details do not form a part of the present invention, they are not described further herein.

Referring now to Figures 2, 3 and 4 of the drawings, a typical filling head H and mold including the mold section M will now be described. The filling head H includes a magazine 35 which, as illustrated, is of inverted wedge-shape having downwardly converging side walls 36 and 37 and generally triangular opposite end walls 38 and 38a. As illustrated in Figure 2, the manifold is mounted on a supporting plate 39 forming a portion of the frame of the machine and may be detachably connected thereto by means of screws 40, 41, etc.

Fluent material is supplied to the magazine 35 by means of any suitable filling mechanism which is adapted to supply the material under pressure. Thus, a tank for the material and having pressure maintained on the material therein by compressed gas or the like, a screw feed having a pressure equalizing reservoir or chamber thereon or a hopper having a control valve and gas pressure applying means, such as is shown in Figure 2 may be used. The filling head H illustrated includes a hopper 42 to which finely divided or powdered material is supplied in any suitable way. Directly below the hopper 42 is a control valve mechanism 43 of the type disclosed in my co-pending application Serial No. 620,531, filed November 5, 1956. The control valve mechanism 43 includes a ball valve member 44 which is provided with a diametrically extending passage 45 and a radially extending passage 46 forming a generally T-shaped cavity within the ball. A sealing ring 47 is mounted in the upper end 48 of the valve casing 49 to engage the ball valve member and prevent escape of gas through the passage 50 between the hopper 42 and the interior of the casing 49 when the ball valve 44 is in the position shown. Another annular sealing ring 51 is mounted in the lower end of the casing 49 and bears against the lower surface of the ball. A sinuous spring ring 42 engages an annular flange 53 extending around the circumference of the sealing ring 51 to maintain the desired sealing engagement between the rings 47 and 51 and the ball valve member 44. In order to enable the control valve mechanism 43 to be disassembled, an annular ring 54 is detachably mounted in the supporting plate 39, and detachably connected to the lower end of the casing 49. The ring 54 also compresses the spring ring 52 to exert upward pressure on the sealing ring 51.

An opening 55 in the bottom of the casing 49 in which the ring 51 is slidably mounted is large enough to permit the ball valve 44 to be removed from the casing 49 upon detaching the casing from the supporting ring 54.

Mounted in openings 56 and 57 in opposite sides of the casing 49 are flanged plate members 58 and 59, respectively, which have gas inlet passages 60 and 61 formed therein for connection with a source of gas under pressure. On the inner sides of the detachable plates 58 and 59 and covering the inner ends of the passages 60 and 61 are porous plates 62 and 63 made, for example, of porous sintered metal having concave inner surfaces substantially concentric with the surface of the ball valve member 44 to permit its rotation between the position shown in Figure 2 and an angularly rotated position in which one end of the passage 45 is in alignment with the passage 50 and the other end is aligned with the magazine 35 to enable the fluent material to flow into the magazine 35 and fill or substantially fill the magazine and the passages 45 and 46. With the ball 44 to the position shown in Figure 2, where gas under pressure is admitted by means of an appropriately controlled and timed valve as shown in application Serial No. 620,531 to exert pressure on the material in the passages 45, 46 and the magazine 35 the fluent material is discharged through the outlet conduits 64 and 65 adjacent the lower end of the magazine 35.

Oscillation of the ball valve 44 is controlled in timed relation to the movement of the mold sections M so that during their movement the magazine 35 is re-charged with material and while the mold sections M are stationary, air is supplied to the valve member 43 to discharge material through the conduits 64 and 65 and then relieve pressure within the magazine 35 and the control valve mechanism 43 to condition it for re-filling.

The porous plates 62 and 63 are provided with very fine pores or passages therethrough which enables the gas pressure within the magazine 35 and the valve mechanism 43 to drop quickly without permitting finely-divided, fluent material to be discharged with the escaping air.

Referring now to Figure 3, it will be seen that nozzles 66 and 67 are rockably mounted on the outer ends of the conduits 64 and 65, respectively. Each pair of conduits and the corresponding nozzles 66 and 67 are used to fill a single tubular container 21 or 22. When a plurality of such containers are to be carried by single mold section M, a corresponding pair of nozzles 66 and 67 is provided for each of the several containers to be filled. In the example illustrated, two pairs of nozzles are provided.

Rocking movement of the nozzles 66 and 67 relative to their respective conduits is permitted by means of ball and trunnion coupling as shown in Figures 3 and 6. For example, the conduit 65 carries on its outer end a generally hemispherical member 68 which has sliding engagement with a sealing ring 69 mounted in a recess 70 in the enlarged base portion 71 of the nozzle. An annular cap nut 72 is threaded on the base portion 71 and is provided with an internal recess 73 within which is mounted a washer 74 of annular formation having semi-cylindrical bosses 75 and 76 engaging in corresponding recesses 77 and 78 in the undersurface of the ball member 68. A sinuous spring ring 79 is interposed between the washer 74 and a flange 80 on the cap nut 72 thereby urging the semi-cylindrical portions 75 and 76 of the washer tightly against the ball and also pulling the sealing ring 69 tightly against the hemispherical surface of the ball member 68, but nevertheless, permitting limited rocking movement of the nozzle as a whole relative to the container 64. In order to limit the rocking movement of the nozzle and avoid crushing the spring 79, bosses or shoulders 81 are formed in the cap nut to limit the travel of the washer 74 toward the magazine. Also, the base of the ball member 68 may be slightly chamfered or inclined to permit the desired rocking movement.

The above-described movement of the nozzles is utilized in connection with the insertion of the nozzles in the opposite ends of a collapsible container and for effecting sealing of the nozzles in the container during filling with the fluent material.

As indicated above, a container unit 19 of the type disclosed in Figure 9 is inserted in the mold section M and is carried thereby to the filling station 32 to enable the fluent material to be introduced into both open ends of the container. To that end, each of the mold sections M includes a mold bottom portion 84 which cooperates with a top section or cover 83 having an upwardly extending flange 85 fixed to a flange 86 extending downwardly from the lower end of the magazine 35. A typical mold cover 83, as shown in Figure 5, includes downwardly extending side flanges 87 and 88 at the opposite sides of the cavity portions 89 and 90 therein. When two or more cavity portions are present in the cover 83, they are separated by a downwardly tapering partition or partitions 91. The inner surfaces 92 and 93 of the side flanges 87 and 88 are inclined inwardly and upwardly in order to render the cavity portions 89 and 90 of upwardly tapering configuration. In the tops of each of the cavity portions 89 and 90 are mounted porous metal plates 94 and 95, such as, for example, porous, sintered metal, to enable air to escape from the cavities. Behind each of the plates 94 and 95 are one or more chambers 96 and 97 which communicate with a cross passage 98 through which air can escape to atmosphere or through which air can be drawn by means of a vacuum pump or the like to aid in withdrawal of the air. Also, as shown in Figures 2 and 3, the cover member 83 has narrow end walls 99 and 100 with outwardly inclined inner surfaces. The end walls are slightly more than half the height of the central partition 91 and lie in a horizontal plane extending lengthwise through the partition.

The mold bottom portion 84 has upwardly extending end flanges 101 and 102 adapted to substantially engage the downwardly extending flanges 99 and 100 of the mold cover 83, shown in Figures 2 to 5. Also, as shown in Figure 5, the mold bottom 84 has relatively shallow side flanges 103 and 104 which are receivable in a complemental recess 105 in the bottom of the mold cover. Mold cavity portions 106 and 107 separated by a relatively low rib 107a in the mold bottom 84 form the bottom of the cavity portions 89 and 90 in the mold top 83. The bottoms of the cavity portions 106 and 107 are also provided with porous plates 108 and 109 through which air can escape or be withdrawn through the passage 110 in the mold bottom 84.

In order to permit opening and closing of the mold, that is, relative up and down movement of the mold bottom 84, it is mounted on a vertically extending shaft 111 which is slidably mounted in a bushing 112 carried at the outer end of the arm A extending from the turntable T of the apparatus shown in Figure 1. Up and down movement of the shaft 111 to close and open the mold is accomplished by means of a cam track 114 mounted below the arms A and engaging a follower roller 115. The cam track 114 can extend entirely around the path of the mold sections M or it may be relatively short and extend about from the container inserting station 31 to the adhesive applicator station B. In this way, the mold bottom 84 is in a lower position, as shown in dotted lines in Figure 3, while the containers are being introduced into it and raised to the full line position when the container or containers are being filled with fluent material. As shown in dotted lines in Figure 3, the container unit 19 is inserted in the mold bottom with the open ends of the containers 21 and 22 extending upwardly and outwardly and with the mid-portion of the container or containers in contact with the porous plates 108 and 109 in the mold cavity portions. The portion of the container in the mold bottom cavity is about equal in length to the combined height and length of the cavity formed between the top and bottom mold sections to enable the container to expand and fill the cavity. This disposes the open ends upwardly so that upon upward movement of the mold bottom 84, the outwardly extending rim of the base web 20 of the containers strikes the outer surface of the nozzles 66 and 67 and spreads the ends of the containers slightly apart to enable the nozzles to slip into the opposite ends of the containers.

To aid insertion of the nozzles in the opposite ends of the containers 21, 22, mechanism is provided for rocking the nozzles outwardly away from the head 83 of the mold. This operation is accomplished by means of camming bars 116 and 117 (Figures 2 to 4) having upwardly extending lugs 118 and 119 pivotally connected to the outwardly extending ears 120 and 121 respectively on the nozzles 66 and 67. Links 122 and 123 are connected to outwardly extending nose portions 124 and 125 on the camming bars 116 and 117 and the upper ends of the links 122 and 123 are pivotally connected to rocker arms 126 and 127 which are pivotally supported at about their midportions on the outwardly extending lugs 128 and 129 fixed to opposite sides of the magazine 35. Actuating links 130 and 131 are pivotally connected to the inner ends of the rocker arms 126 and 127 and the links 130 and 131 may be moved up and down to rock the nozzles in and out in timed relation to up and down movement of the mold bottom 84. Also, as shown in Figure 7, the nozzles 66 and 67 have an arcuate inner surface portion 132 and a flat outer surface portion 133 and also have an inclined end surface 134 thereon to enable them to enter the containers without substantially bending the web 20. The fact that one of each of the nozzle surfaces is flat permits the bags to be closed without separating adjacent bags at their mouths. This facilitates subsequent handling operations.

To accommodate the nozzles and prevent leakage or rupturing of the ends of the containers during filling, the ends 99 and 100 of the upper mold section are provided with openings, such as the inclined semi-circular notches 135 and 136 (Figure 8), which are substantially complemental to the shape of the curved surface 132 of each nozzle and are provided with sealing gaskets 137 of resilient material such as rubber or the like for resilient engagement with the outer surfaces of the containers 21 and 22. A seal between the outer flat surface of each of the nozzles 66 and 67 is obtained by extending the camming bars 116 and 117 along substantially the entire length of the end flanges 101 and 102 of the lower mold section, as shown in Figure 4, and providing a resilient sealing member 138 and 139 (Figure 3) on each of the bars 116 and 117 for engaging the outer side of the web portion 20 of the container unit 19. Further, in order to reinforce and close the mold, each of the camming bars 116 and 117 is provided with a wedge-shaped portion 140 and 141 which extends into or substantially into engagement with chamfered surfaces 142 and 143 on the upper edges of the flanges 101 and 102 of the mold bottom 84.

In the operation of the above-described apparatus, a collapsed tubular container unit 19 containing two containers 21 and 22 is inserted in the mold bottom 84 with the latter in the dotted line position and the container unit is pressed down against the bottom plates 108 and 109 of the cavity sections 106 and 107 and are retained thereby by friction or by reduced pressure exerted through the passage 110 and the porous plates 108 and 109. The lengthwise extending slit 28 between the containers 21 and 22 slips over the upwardly extending rib 107a between the cavity sections 106 and 107 so that the two containers lie flat against the porous plates 108 and 109. The mold is then moved to the filling station 32 and during such movement, the mold bottom 84 is lifted by means of the lobe of the cam track 114 into engagement with the mold top or cover 83. During upward movement of the mold bottom 84, the nozzles 66 and 67 are swung out of the passages 135 and 136 in the mold top so that they are in a position to engage the projecting ends of the web 20 and thus force the opposite ends of the containers open and enable the nozzles to slide into the open ends of the containers. When the nozzles are inserted in the ends of the container, the nozzles are swung inwardly into the passages 135 and 136 by means of the linkage 131, 127, 122 and 125 and the sealing members 138 and 139 on the bars 116 and 117 engage the web portion 20 of the container units 21 and 22 and press it against the flat surfaces 133 of the nozzles 66 and 67. Also, the end portions of the tops 22 and 23 of the container are bent to conform to the curved surfaces 132 of the nozzles and are forced against the sealing members 137 in the passages 135 and 136 as the wedge-shaped portions 140 and 141 of the bars 116 and 117 move in to engage the chamfered surfaces 142 and 143 of the lower mold section 84 and thereby close the ends of the cavities formed by the aligned cavity portions 89, 106 and 90, 107. Upon application of gas pressure to the fluent material in the valve mechanism 44 and in the magazine 35, the material is forced through the nozzles into opposite ends of the collapsed containers thereby filling them and expanding them to completely fill the mold cavities. Air in the mold cavities around the containers is expelled quickly through the porous plates 94, 95, 108 and 109 during filling of the container to enable the containers to expand and fill the cavity and thereby accurately control the volume of the material received in the containers. The tapered formation of the sides and ends of the cavities prevent clinging of the containers to the top and bottom of the mold and the formation of wrinkles in the containers during filling. The wedge-shaped ends and sides formed on the filled containers by the shape of the mold cavities, also facilitates removal of the containers from the top and bottom mold sections.

After the containers are filled, as described above, pressure is released in the valve mechanism 43 and the magazine 35, and the mold bottom 84 (mold section M) is moved by rotation of the turntable T to the adhesive applicator or flap-folder and sealer. During such rotation of the turntable, the mold bottom 84 moves downwardly and the nozzles are swung away from the mold top 83 to release the ends of the containers so that they can slide off the nozzles. After sealing the filled containers, they are discharged from the mold sections M and carried away for further processing by the conveyor C. For example, the wedge-shaped ends and tapering sides of the containers can be squared to render them parallelopipedal in shape.

It will be understood that the above-described operations are conducted in the timed relation indicated above so that a plurality of package units are undergoing processing, including insertion of the containers in the mold sections M, filling, flap-folding, sealing and discharging. Moreover, it will be understood that while an intermittently-driven mold mechanism is disclosed and described above, the apparatus may be constructed and arranged so that the mold sections M are mounted on a chain to form a chain mold similar to the chain mold shown in application Serial No. 611,231, for movement in an orbital path having straight portions connected by curved portions. Moreover, instead of moving the mold sections M intermittently, they may be moved continuously and the filling head mounted to move with the mold bottoms during filling, also as shown in application Serial No. 611,231.

The apparatus described above is particularly suited for filling containers with fluent materials which flow relatively slowly and for filling relatively large containers.

In accordance with the invention, small containers can be filled with the apparatus described above from one end only by eliminating one of the filling nozzles 66 or 67 and sealing one end of the container by folding over the projecting portion of the base web 20 on top of the top panels 23 and 24 of the containers 21 and 22 to close one end of each container thereby leaving only one end open for filling with the remaining nozzle on the filling apparatus.

Figure 10:
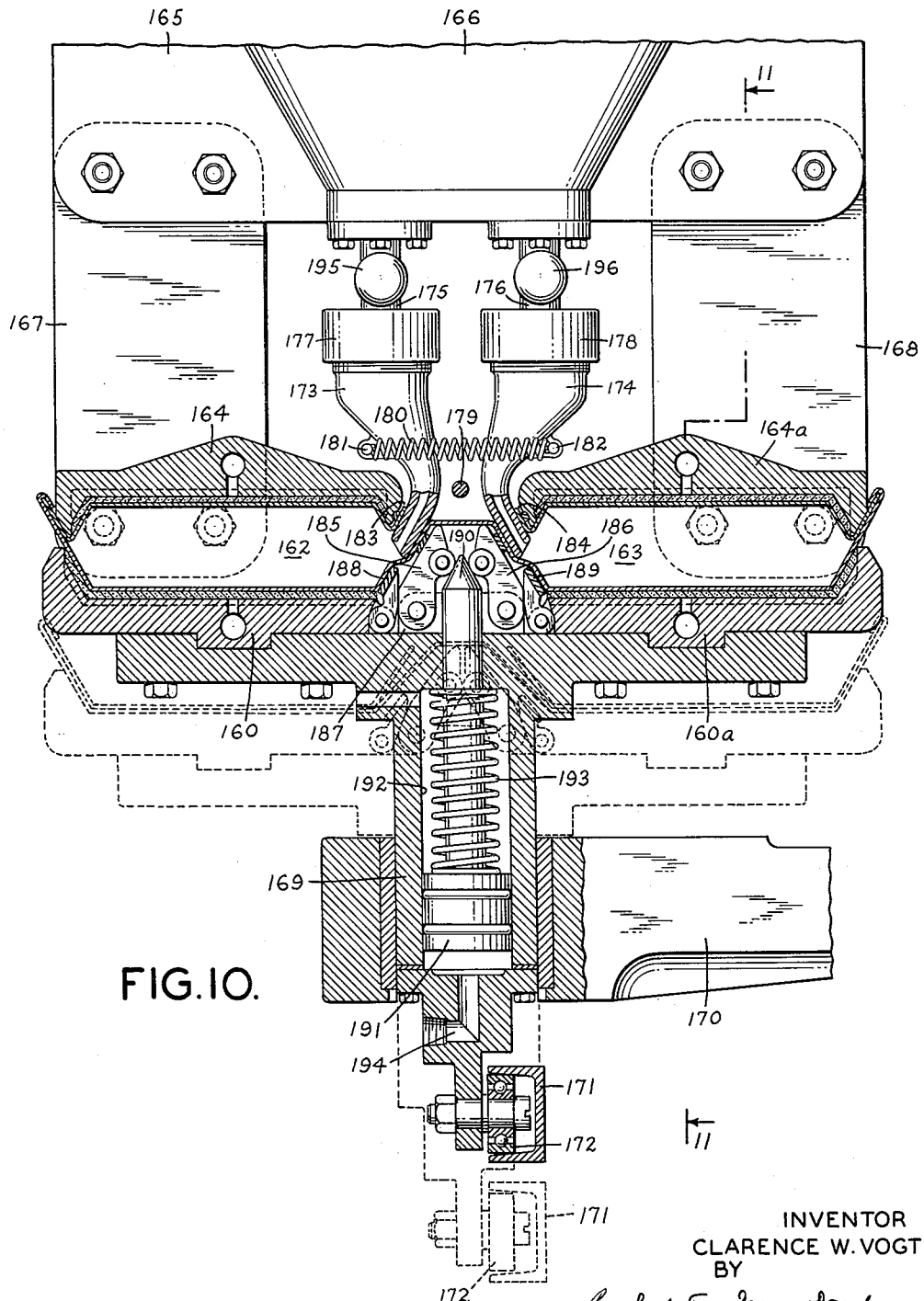
Figure 10 is a view in elevation and partly in vertical section of a modified form of filling apparatus for filling multiple containers.

Moreover, as shown in Figures 10, 11 and 12, the apparatus can be modified to fill a plurality of pairs of containers simultaneously. With this type of apparatus, a somewhat different form of container unit is used as shown in Figure 12. As shown, a unit may consist of four containers including the pair 151 and 152 and another opposed pair 153 and 154. However, two, six, eight or more containers arranged in opposed pairs can be handled with an appropriately constructed machine. Inasmuch as the containers 151 to 154 are to be filled through one end only, the ends of the base web 155 which forms a common side for all of the containers are folded over and sealed to the opposite side of each container and to itself to close the outer ends 151a to 154a of the containers while leaving the opposed inner ends of the containers unsealed. Interposed between each pair of containers are the slits 156 and 157 for admitting the dividing rib in the mold bottom, as described above. Score lines or rows of perforations may also be formed between the containers to permit them to be separated, after filling. In the modified form of apparatus shown in Figures 10 and 11, each mold comprises a pair of mold bottoms 160 and 160a, each of them having recesses therein to form one pair of mold cavity portions 162 and 163 therein thereby accommodating a container unit 150 made up of four containers as shown in Figure 12. In this apparatus, the mold top includes two top members 164 and 164a, each having cavity portions therein corresponding to the cavity portions in the mold bottoms. A plate 165 fixed to the magazine 166 of the filling head by means of rigid straps 167 and 168 supports the mold top members 164 and 164a. The mold bottoms 160 and 160a are mounted on a shaft 169 slidable vertically in a supporting arm 170 of a turntable (not shown) and is moved up and down by means of a cam track 171 which engages the follower roller 172 mounted on the lower end of the shaft.

Mounted on and extending below the magazine 166 of the filling head are pairs of nozzles 173 and 174 each of which corresponds to one of the cavities in the mold top and bottom. The individual sections of the mold bottoms and mold tops are constructed in the same manner as the mold shown in Figures 2 to 5, but the arrangement of the nozzles 173 and 174 and the actuating mechanism therefor are different as explained hereinafter. Thus, the nozzles 173 and 174 are mounted on conduits 175 and 176 extending from the bottom and communicating with the interior of the magazine 166 by means of rockable couplings 177 and 178 like the couplings shown in Figures 3 and 6. The nozzles 173 and 174 are normally urged toward each other and into engagement with a stop member or pin 179 by means of a tension spring 180 having its opposite ends connected to lugs 181 and 182 on the nozzles.

Movement of the nozzles into the semi-cylindrical passages or notches 183 and 184 which are formed in the adjacent ends of the mold top members 164 and 164a is controlled by means of pivoted camming bars 185 and 186 which are pivotally connected at their lower ends to flanges 187 which are fixed to the two mold bottoms 160 and 160a. Also, the pivoted cam bars 185 and 186 engage inner end flanges 188 and 189 which are pivotally connected to the adjacent ends of the mold bottoms 160 and 160a and take the place of a fixed end flange of the mold bottom disclosed in Figures 2 to 5. The arrangement of the cam bars 185 and 186 and the end flanges 188 and 189 is such that they normally swing toward each other to the dotted line positions shown in Figure 10.

A plunger 190 having a piston 191 fixed to its lower end and slidable in a cylinder 192 formed within the shaft 169 is provided to move the cam bars 185 and 186 and the pivoted flanges 188 and 189 into operable relation to the nozzles and containers. A spring 193 normally biases the plunger 190 and the piston 191 downwardly and the piston and plunger are moved upwardly by means of compressed air or other pressure fluid admitted into the lower end of the cylinder 92 through the passage 194 to engage the cam bars 185 and 186 and move them and the flanges 188 and 189 apart.

With this modification of the invention, a container unit 150 such as that described above, is placed on the mold bottom with the left-hand containers 151 and 153 in the cavity portions of the mold bottom 160 and the containers 152 and 154 in the cavity portions in the mold bottom 160a so that the closed ends of the containers are disposed adjacent to and extending beyond the outer ends of the mold bottoms and the portion of the web 155 between the open ends of the containers overlying and resting against the retracted cam bars 185 and 186 and the retracted mold bottom flanges 188 and 189, as shown in dotted lines in Figure 10. As the mold bottom is moved up towards the mold tops 164 and 164a, the ends of the nozzles 173 and 174 will engage the web 155 between the open ends of the containers. Thereafter, fluid pressure is admitted to the cylinder 192 thereby moving the plunger 190 upwardly and forcing the cam bars 185, 186 and the pivoted end flanges 188 and 189 apart. Outward movement of the cam bars 185 and 186 tends to tension the web 155 and forces the mouths of the containers to open slightly to enable the nozzles 173 and 174 to slide into them. Continuing outward movement of the cam bars pushes the nozzles apart and into the passages 183 and 184 in the mold tops 164 and 164a as the mold sections come together. To prevent leakage around the nozzles during filling, the mold tops 164 and 164a may be provided with sealing gaskets around the passages 183 and 184 and likewise the cam bars 185 and 186 are provided with resilient packings or sealing strips which seal the containers to the opposite sides of the nozzles. When pressure is applied to the fluent material in the magazine 166, as described above, the fluent material is introduced simultaneously into all of the containers carried by the molds so that they are expanded into contact with the top and bottom and side surfaces of the mold cavities to completely fill the containers. After filling the containers and pressure has been relieved on the material in the magazine 166, the plunger 190 is retracted and the mold bottoms 160 and 160a are lowered. The container unit 150 is then transferred to further processing where the containers 151 and 153 are separated from the containers 152 and 154 and they are sealed by folding the projecting portions of the web 155 over the open ends of the containers and sealing them to the top of the containers. The containers may then be subjected to such further treatment thereof as may be desired.

When filling containers with fluent materials of the powdered type, the material does not leak from the magazine and the nozzles when pressure is not applied to the material. With some forms of liquid and fluent plastic or semi-plastic materials, the material would tend to leak out of the magazine and the nozzles if means are not provided for preventing such leakage. Accordingly, when handling such liquid or highly fluent materials, both of the apparatuses described above may have shut-off valves 195 and 196 interposed in the conduits between the magazine and the nozzles, these valves being opened during the filling operation, but closed at all other times.

Figure 13:
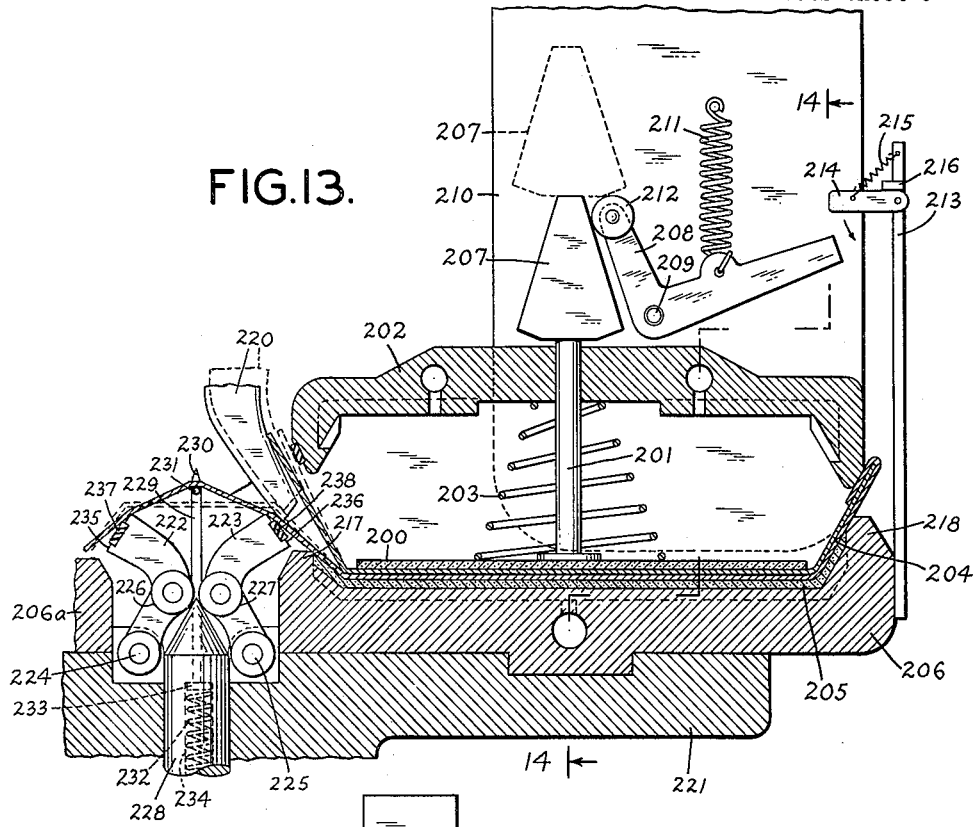
Figure 13 is a view in vertical section through a modified type of mold including mechanism for holding the containers in collapsed or flattened condition prior to filling.
Figure 14:
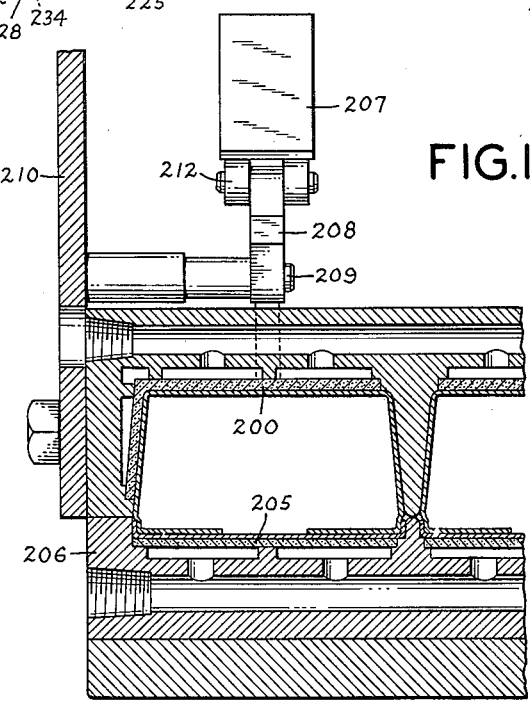
Figure 14 is a view in section taken on line 14—14 of Figure 13 showing the container in expanded or filled condition.

Moreover, difficulty is sometimes encountered in keeping the containers in a collapsed condition after they are inserted in the mold bottom sections. Thus, containers composed of some types of non-porous plastic sheeting or paper may have a tendency to spring open slightly so that air is present in the container which tends to obstruct filling of the containers. Porous container material will permit the escape of air, but the non-porous material traps air in the containers and causes variation in the weight and/or volume of the fluent material therein. When handling non-porous containers, the apparatus may be modified to include devices for collapsing the containers. As shown in Figures 13 and 14, an appropriate mechanism for keeping the containers collapsed prior to filling includes a plate 200 formed of porous material mounted on a shaft 201 extending through and slidable relative to the mold top 202 and a spring 203 normally urging the plate downwardly to compress and collapse a container 204 between it and the porous bottom 205 of the mold bottom section 206. The spring 203 is very weak so that the plate 200 is easily displaced upwardly by the pressure under which the fluent material is introduced into the container. However, inasmuch as even this light spring pressure might tend to force some of the fluent material out of the open end of the container when the nozzle or nozzles are withdrawn from the container or containers, locking means is provided for retaining the plate in its retracted position. A suitable locking means includes a wedge-shaped member 207 fixed to the upper end of the shaft 201 for engagement with a pawl member 208 in the form of a bellcrank lever mounted on a pivot 209 carried by the strap 210 for supporting the mold top. A spring 211 connected to the bellcrank lever normally biases a roller 212 thereon against an inclined side surface of the wedge member 207 and rocks it beneath the wedge-shaped member 207 to lock it in retracted position when it has been raised by the filling of the container in the mold. In this way, the plate 200 cannot exert pressure on the filled container. A trip member is carried by the mold bottom section 206 for rocking the pawl 208 in a clockwise direction to release the pressure plate 200 for downward movement toward the mold bottom section. A suitable trip member includes an upwardly extending rod 213 on the outer end of each mold bottom section 206 on which a pawl 214 is pivotally mounted. The pawl is normally biased by means of a spring 215 against a stop member 216 which prevents its upward movement beyond a position extending about at a right angle of the rod 213 but enables the pawl 214 to be rocked in a counter-clockwise direction about its pivot. The pivoting movement of the pawl 214 permits it to pass by the end of the pawl 208 as the mold bottom section 206 moves up. During downward movement of the mold bottom section 206, the outer end of the pawl 214 strikes the end of the pawl 208 and moves it clockwise from beneath the wedge-shaped head 207 thereby releasing the pressure plate 200 for downward movement toward the mold bottom.

Also, as shown in Figure 13, other means than those described above can be included in the apparatus for opening the open ends of containers of the type shown in Figure 12 to admit the filling nozzles. In this embodiment of the invention, the bottom mold sections 206 and 206a have fixed opposite end flanges 217 and 218 and each has the porous metal plates 205 extending along the bottoms of the cavities therein and upwardly along the inside of the fixed end flanges 217 and 218 so that vacuum can be applied to hold the containers firmly against the bottom and end flanges of the mold sections 206 and 206a.

A nozzle 220 mounted like the nozzles 173 and 174 is provided for each of the cavities in each of the molds formed by the top and bottom mold sections.

Interposed between the adjacent ends of the mold bottom sections 206 and 206a and mounted on the supporting plate 221 for the mold bottom sections are cam bars 222 and 223 which are supported at their lower ends on the pivots 224 and 225. The cam bars are provided with follower rollers 226 and 227 for cooperation with a vertically reciprocable plunger 228 similar to the plunger 190 shown in Figure 10 and actuated in the same way. Slidably mounted in the upper end of the plunger 228 is a positioning and supporting pin 229 having a pointed upper end 230 for piercing the web extending between the opposed containers 151 and 152, for example, and holding it in position. A cross bar or pin 231 which is substantially equal in length to the width of the web between the containers extends transversely of the pin 229 adjacent to its upper end to support the web in an upwardly bent position as shown in Figure 13 when the plunger 228 is retracted. The pin 229 is slidably mounted in the plunger and is normally biased upwardly by means of a spring 232 engaging an enlarged head 233 on the lower end of the pin which is slidably received in a bore 234 in the plunger 228.

Outwardly extending end portions 235 and 236 on the cam bars are so related to the inner end flanges of the mold sections 206 and 206a that the web is bent over them when the cam bars are in the retracted position as shown in Figure 13. Bending of the web adjacent to the ends of the containers and subjecting the web to tension by means of the pin 229 and cross bar 231 thereon causes the open ends of the container to spread apart as shown in Figure 13 thereby permitting the nozzles 220 to readily enter the open ends of the containers.

When the plunger 228 is raised, after the top and bottom mold sections have been brought to closed position, the cam bars 222 and 223 are moved apart thereby swinging the nozzles 220 against the adjacent ends of the mold top sections 202 and clamping one wall of each container between the nozzle and the end flange of the top section and the opposite wall of the container between the sealing strips 237 and 238 on the outer ends of the cam bars and the outside of the nozzle. At the same time, the pin 229 retracts against the pressure of the spring 32 to allow the web to move to the dotted line position thereby taking up the slack in the web which is introduced by engagement of the web with the pin 229 and cross bar 231 when the containers are inserted in the mold bottom sections. In this way, the web between the containers is not subjected to sufficient tension to cause the groups of containers to separate on the transverse score line between the open ends of the opposed containers. However, if desired, the movement of the pin 229 may be limited by a stop in the bore 234 so that upon outward movement of the cam bars to clamp the ends of the containers around the nozzles, the web is severed along its transverse score line to separate the two opposed groups of containers. Severing of the web facilitates subsequent handling of the containers inasmuch as the flaps at the inner ends of the container are then free to be folded over the open ends of the filled containers to seal them.

The apparatuses and methods described above assure the filling of gusseted containers with accurately controlled volumes and weights of material and produce packages of uniform shape and size economically and at high production rates.

It will be understood that from the foregoing description of typical examples of the invention that the apparatuses are susceptible to considerable modification and that they may be used for filling single containers or simultaneously filling large numbers of containers so that the machine can readily be constructed to satisfy the packaging rates required in the industry.

In view of the changes that may be made in the apparatus and method, it will be understood that the examples given above are illustrative and should not be considered as limiting the scope of the following claims.

I claim:

1. A method of filling open-ended tubular containers having top and bottom panels extending lengthwise of said container, comprising inserting said container in collapsed condition in a mold cavity with the ends of the container extending out of said cavity, forcing fluent material under pressure into said ends of said container to fill said container with said material and to expand the container to fill said cavity and closing the ends of said container.

2. The method set forth in claim 1 in which the midportion of the container is disposed in said cavity and is of a length substantially equal to the length and the height of said cavity.

3. Apparatus for filling containers comprising a mold member having separable sections forming at least one cavity therein for receiving a container in collapsed condition having at least one open end, means for moving said sections toward and away from each other, a nozzle adjacent one end of one of said mold sections, means supporting said nozzle for rocking movement to engage in an open end of said container, means for supplying fluent material to said nozzle for introduction into said container, and means on said mold sections for clamping said container to said nozzle with the latter in said open end to prevent escape of said material around said nozzle.

4. Apparatus for filling containers comprising a mold member having engageable and disengeable upper and lower mold sections, means for moving said mold sections relatively into and out of engagement, at least one relatively low rib extending lengthwise of the lower mold section to form a plurality of cavity portions therein, and at least one partition extending lengthwise of said upper mold sections and dividing it into a plurality of cavity portions, said partition being aligned with and engaging said rib when said mold portions are engaged to form a plurality of mold cavities therein for receiving a plurality of containers.

5. The apparatus set forth in claim 4 in which said mold member has at least two groups of cavities therein, each group having a plurality of cavities in side-by-side relation and with the cavities of one group in end-to-end alignment with the other group, said cavities receiving a plurality of groups of collapsed containers corresponding in position and number to said cavities and the containers of said groups having open inner ends and closed outer ends, a web connecting said containers and extending between them, said web having slits between the containers of each group for receiving said ribs, and means movable relative to said mold member for engaging the web between the groups of containers adjacent to their open ends to tension the web and open the ends of said containers.

6. The apparatus set forth in claim 5 comprising passages through said mold member communicating with the adjacent ends of said groups of mold cavities through which the open ends of said containers extend, nozzles corresponding to each of said passages engageable in the open ends of said containers, and means for introducing fluent material through said nozzles into said containers.

7. Apparatus for filling containers comprising a mold member having engageable and disengageable upper and lower mold sections, means for moving said mold sections relatively into and out of engagement, at least one relatively low rib extending lengthwise of the lower mold section to form a plurality of cavity portions therein, at least one partition extending lengthwise of said upper mold sections and dividing it into a plurality of cavity portions, said partition being aligned with and engaging said rib when said mold portions are engaged to form a plurality of mold cavities therein for receiving a plurality of containers, means forming passages in at least one end of said mold member communicating with the mold cavities therein, and a nozzle corresponding to and receivable in each passage for introducing material into the containers in said cavities.

8. The apparatus set forth in claim 7 in which the ends of said mold sections are disposed in about a plane passing through the middle of said cavities and through said partitions when said mold sections are engaged, said passages being notches in the lower edges of the ends of said uppper mold sections.

9. The apparatus set forth in claim 7 comprising means rockably supporting said nozzles and means for rocking said nozzles into said passages as said mold sections are moved into engagement and means for moving said nozzles out of said passages as said mold sections are moved out of engagement.

10. The apparatus set forth in claim 7 in which said mold member has passages at both ends of said cavities.

11. The apparatus set forth in claim 7 comprising pressure members mounted in said cavity portions of said upper mold section, means urging said pressure members toward said lower mold section to maintain the containers in collapsed condition, said pressure members being displaceable by said containers as said material is introduced into them to enable the containers to be filled, and releasable means for locking said pressure members against movement toward said lower mold section when said containers are filled.

12. The apparatus set forth in claim 7 comprising pressure members mounted in said cavity portions of said upper mold section, means urging said pressure members toward said lower mold section to maintain the containers in collapsed condition, said pressure members being displaceable by said containers as said material is introduced into them to enable the containers to be filled, releasable means for locking said pressure members against movement toward said lower mold section when said containers are filled, and means responsive to movement of said mold sections out of engagement for releasing said locking means.

13. An apparatus for filling containers comprising a lower mold section and an upper mold section, each section having at least two groups of cavities therein in end-to-end relation, means for moving said mold sections together to align the cavities therein and form two groups of mold cavities to receive groups of containers having opposed open ends and connected by a web extending from one group of mold cavities to the other group of mold cavities, a nozzle for introducing fluent material into the container in each mold cavity, means supporting the nozzles between said mold cavities for movement toward and away from said mold cavities, cam bars between said nozzles and pivotally mounted in the lower mold section for moving said nozzles toward said cavities, means for moving said cam bars, a resiliently biased member between said cam bars engaging said web and drawing it against said cam bars to bend the web adjacent to the open ends of each container and spread the open end thereof to admit said nozzle into said open end.

14. A method of filling containers comprising disposing in substantially a common plane a plurality of collapsed, tubular containers connected together by a web having weakened portions between said containers enabling separation of said containers and each container having at least one open end, confining said containers while they are joined by said web in separate cavities substantially completely enclosing said containers to control the amount of fluent material to be introduced therein, the length of each collapsed container in said cavity exceeding the length of said cavity by a distance about equal to the height of said cavity, simultaneously introducing fluent material into the open ends of said containers to fill them and expand them to fill said cavities and sealing the open ends of said containers.

15. Apparatus for filling containers comprising a mold member having a plurality of cavities therein for receiving a plurality of collapsed containers joined by a connecting web having slits therein between said containers, each of said containers having at least one open end extending out of said mold member, said mold member having upper and lower separable sections, partitions therein extending through said slits between said containers and confining them in said cavities, a nozzle engageable in said open end of each container, means for supplying a fluent material under pressure to said nozzle to fill said containers and expand them to fill said cavities.

References Cited in the file of this patent

UNITED STATES PATENTS

| 2,064,213 | McJoynt | Dec. 15, 1936 |
| 2,436,119 | Parker | Feb. 17, 1948 |
| 2,815,621 | Carter | Dec. 10, 1957 |